(12) United States Patent
Maringer

(10) Patent No.: US 9,550,244 B2
(45) Date of Patent: Jan. 24, 2017

(54) TOOL HOLDER AND ATTACHMENT HEAD HAVING SAID TOOL HOLDER

(71) Applicant: WFL Millturn Technologies GmbH & Co. KG, Linz (AT)

(72) Inventor: Herbert Maringer, Sattledt (AT)

(73) Assignee: WFL Millturn Technologies GmbH & Co. KG, Linz (AT)

( * ) Notice: Subject to any disclaimer, the term of this patent is extended or adjusted under 35 U.S.C. 154(b) by 95 days.

(21) Appl. No.: 14/431,911

(22) PCT Filed: Sep. 27, 2013

(86) PCT No.: PCT/EP2013/070234
§ 371 (c)(1),
(2) Date: Mar. 27, 2015

(87) PCT Pub. No.: WO2014/049135
PCT Pub. Date: Apr. 3, 2014

(65) Prior Publication Data
US 2015/0239054 A1    Aug. 27, 2015

(30) Foreign Application Priority Data
Sep. 28, 2012   (EP) .................................... 12186646

(51) Int. Cl.
*B23F 23/12*   (2006.01)
*B23C 5/26*    (2006.01)
*B23F 5/22*    (2006.01)

(52) U.S. Cl.
CPC .............. *B23F 23/1243* (2013.01); *B23C 5/26* (2013.01); *B23F 5/22* (2013.01); *Y10T 407/1725* (2015.01)

(58) Field of Classification Search
CPC ......... B23F 5/22; B23F 23/12; B23F 23/1206; B23F 23/1237; B23F 23/1243; B23C 5/26; B23C 2210/56; Y10T 407/1715; Y10T 407/173
(Continued)

(56) References Cited

U.S. PATENT DOCUMENTS 3,249,015 A * 5/1966 Schuster ............. B23B 31/4073
                                                    403/256
3,648,563 A * 3/1972 Sollinger ............ B23F 23/1206
                                                    409/233
(Continued)

FOREIGN PATENT DOCUMENTS

CN      102126054 A  *  7/2011
DE      2 137 396 A1     2/1973
(Continued)

OTHER PUBLICATIONS

International Search Report of PCT/EP2013/070234, mailed Mar. 7, 2014.

*Primary Examiner* — Daniel Howell
(74) *Attorney, Agent, or Firm* — Collard & Roe, P.C.

(57) ABSTRACT

There is shown a tool holder for a hob, which is embodied as a bore having a clamping device provided between a spindle and a counterholder, the clamping device having a centring clamping piece that is engageable in the hob and a receiving mandrel that is engageable in the hob, the receiving mandrel being braced with the centring clamping piece in order to mount the hob, wherein the centring clamping piece has a flange. In order to ensure the best concentric running properties in a stable manner, it is proposed that the centring clamping piece and the receiving mandrel each have a flange, which each mount a radial adjusting drive with at least one adjusting member that is adjustable with respect to the spindle and/or the counterholder in order to center the clamping device.

15 Claims, 3 Drawing Sheets

(58) Field of Classification Search
USPC .................................. 279/6; 409/11, 236
IPC ........................................... B23F 23/12
See application file for complete search history.

(56) References Cited

U.S. PATENT DOCUMENTS

| | | | |
|---|---|---|---|
| 4,015,510 A | * | 4/1977 | Hodgson .............. B23F 23/1206 |
| | | | 279/141 |
| 4,111,098 A | * | 9/1978 | Ainoura .................... B23F 5/22 |
| | | | 409/11 |
| 5,192,172 A | * | 3/1993 | Lunazzi .............. B23B 31/4073 |
| | | | 409/11 |
| 2003/0017013 A1 | | 1/2003 | Soltau et al. |

FOREIGN PATENT DOCUMENTS

| DE | EP 0020864 A1 | * | 1/1981 | .......... B23F 23/1206 |
|---|---|---|---|---|
| EP | 1 279 455 A1 | | 1/2003 | |
| SU | 724281 A1 | * | 3/1980 | |

* cited by examiner

TOOL HOLDER AND ATTACHMENT HEAD HAVING SAID TOOL HOLDER

CROSS REFERENCE TO RELATED APPLICATIONS

This application is the National Stage of PCT/EP2013/070234 filed on Sep. 27, 2013, which claims priority under 35 U.S.C. §119 of European Application No. 12186646.1 filed on Sep. 28, 2012, the disclosure of which is incorporated by reference. The international application under PCT article 21(2) was not published in English.

TECHNICAL FIELD

The invention relates to a tool holder for a hob in a bore design, having a clamping device provided between a spindle and a counter-holder, which device has a centering clamping piece that can engage into the hob and an arbor that can engage into the hob, which arbor is braced together with the centering clamping piece in order to mount the hob, wherein the centering clamping piece has a flange.

STATE OF THE ART

In order to increase the concentricity of a hob in a bore design, clamped between a spindle and a counter-holder, DE2137396A1 discloses providing a clamping device on a tool holder, which device has a centering clamping piece, an arbor, and an anchor screw as a connection element between these two parts, operatively connected with them. Centering clamping piece and arbor engage into the axial bore of the hob, and are braced against the hob using the anchor screw. The centering clamping piece forms a flange having an inner cone, in which the outer cone of the counter-holder centers itself. By means of such a design, join play between hob, clamping device, counter-holder and/or spindle are relatively difficult to balance out, preventing centered clamping of the hob, and therefore concentricity errors cannot be avoided. Such concentricity errors must particularly be feared if the hob is subject to comparatively great cutting forces.

Furthermore, a clamping device for a hob in a bore design is known from the prior art (EP1279455A1), in which the hob is braced axially and radially. For this purpose, this clamping device is equipped with a centering clamping piece that can engage into the axial bore of the hob, with an arbor that can engage into the axial bore of the hob, and with a clamping anchor. Centering clamping piece and arbor are provided with an outer cone and a radial collar, which ensure axial and radial mounting of the hob on the clamping device when braced by way of the clamping anchor. Grooves are provided on the radial collar for connecting the clamping device with accommodations of the machine tool, for example: a tool spindle and a counter-holder. It is disadvantageous that a comparatively precise fit seat is required between centering clamping piece, arbor, and hob, in order to create precise centering of the hob and thereby high concentricity properties. This is comparatively complicated in terms of design.

PRESENTATION OF THE INVENTION

The invention has now set itself the task of implementing a tool holder for a hob in a bore design, of the type described initially, in terms of design, in such a manner that the hob can be centered quickly, and, after it has been centered, a high concentricity property can be ensured. Furthermore, it should be possible to produce the tool holder with a simple design and therefore cost-advantageously.

The invention accomplishes the set task in that centering clamping piece and arbor each have a flange that each support a radial setting drive having at least one setting element that can be adjusted against the spindle or the counter-holder, for centering the clamping device.

If centering clamping piece and arbor each have a flange that each support a radial setting drive having at least one setting element that can be adjusted against the spindle or the counter-holder, for centering the clamping device, the braced hob can be centered relative to spindle and counter-holder in comparatively easy to handle manner. This is because both radial setting drives can be activated independent of one another, thereby making it possible to correct concentricity errors relatively quickly. Furthermore, by generating clamping forces, the radial setting drives can also compensate concentricity errors in the mounting of the hob that are attributable to the clamping device. Furthermore, in this way a possible join play between clamping device, spindle, and counter-holder can also be balanced out, so that even at comparatively high cutting forces, no deviation of the braced hob needs to be feared. The tool holder according to the invention can therefore ensure the highest concentricity properties of the hob, in stable manner. Furthermore, a radial setting drive can be provided on a flange with a relatively simple design, so that a cost-advantageous solution can be made available in order to guarantee the highest concentricity properties of the hob.

In general, it should be mentioned that in hobs, a distinction is made with regard to their accommodation by the tool holder, between hobs in a bore design and hobs in a shaft design. In bore designs, there is a continuous axial bore in the hob, which axial bore can be used to transfer torque. This axial bore can also serve for accommodating a fitting spring. A bore is understood to be a hole of any shape, produced in any manner, that passes through the hob. In the case of a shaft design, shafts are provided at the ends of the tool, for transferring torque.

A comparatively high rigidity at the tool holder can be achieved if the spindle and/or the counter-holder is/are fitted into the respective flange of centering clamping piece or arbor. Furthermore, this can make a radial adjustment mechanism for centering the clamping device possible, with a simple design, in that the setting element can also be structured to be adjustable radially against the spindle or the counter-holder. Furthermore, this fit can also facilitate mounting of the clamping device, thereby making simplification of the handling of the tool holder possible.

If the radial setting drive has multiple setting elements that lie diametrically opposite one another, extremely sensitive compensation of concentricity errors can be made possible on the milling tool, particularly since multi-axial adjustment of the clamping device relative to spindle and counter-holder can thereby also be made possible. It is advantageous that stud screws can further facilitate centering of the milling tool.

The design conditions can be further simplified if centering clamping piece and arbor are each configured in one piece. In this way, their rigidity can furthermore be increased.

It is known that bracing between clamping anchor and centering clamping piece can be made possible, with a simple design, if the clamping device has a clamping anchor that axially connects centering clamping piece and arbor, and braces them relative to one another.

If the clamping device has a clamping element operatively connected with the clamping anchor, which element is provided between clamping anchor and centering clamping piece or arbor, secure radial mounting of the hob can be made possible, independent of the seat of the hob on the clamping device, if the clamping element interacts with the clamping anchor and centering clamping piece or arbor to produce radial mounting of the hob. This is because the axial bracing of centering clamping piece and arbor can be utilized to press the outer cone against the centering clamping piece or the arbor, and to produce a pressing force between centering clamping piece or arbor and hob. In this way, not only can a possible join play be balanced out on a clamping device, but also, the demands on dimensional precision in the seat of the clamping device can be reduced. A fit seat between clamping device and hob, which is relatively complicated to produce, can therefore be avoided. Furthermore, the clamping device according to the invention can also be used in a plurality of hobs in a bore design. This is because the clamping element can form a seat corresponding to the axial bores of the hob on the centering clamping piece or arbor. Universal usability of the clamping device can result in this way, wherein high bending resistance can be guaranteed by means of this axial bias of the clamping elements on the hob. Because a clamping element can also be provided between the clamping anchor and centering clamping piece or arbor with a relatively simple design, this can combine the advantages with regard to the design simplicity and cost advantage with the advantages of extremely precise concentricity of the hob.

Centering of the hob that can be handled in particularly sensitive manner can result if centering clamping piece and/or arbor has/have an inner cone against which an outer cone of the respective clamping element rests. Furthermore, in this way a clamping surface having a wider effect can be created, in order to thereby improve the radial mounting of the hob on the seat.

If a clamping element is provided for each of centering clamping piece and arbor, centering of the hob can be made possible in simplified manner.

Simple assembly and disassembly conditions on the clamping element can open up if the clamping anchor passes through the hollow centering clamping piece and the hollow arbor. As a result, the clamping anchor can be accessible from two sides.

Clamping anchor and clamping element can be operatively connected in mechanically simple manner if the clamping anchor engages into an inside thread of the respective clamping element with its outside thread.

If at least one clamping element has a radial clamping collar, which lies against a crosspiece of the centering clamping piece or of the arbor, the radial pressing force of the clamping element can be limited and thereby the risk of excessive strain on the hob during mounting can be kept low. Furthermore, in this way mounting of the hob can be facilitated, because after the maximal radial pressing force has been reached, attention needs to be paid only to axial bracing.

If the radial clamping collar supports an axial setting drive having at least one setting element that can be adjustable relative to the crosspiece, centering of the hob relative to centering clamping piece or arbor can be adjusted in relatively simple manner.

Preferably, the axial setting drive has multiple setting elements that lie diametrically opposite one another, in order to thereby be able to handle a multi-axial adjustment in simple manner. In this manner, the concentricity property can furthermore also be improved. In particular, stud screws can excel as setting elements for this purpose.

The crosspiece of the centering clamping piece or of the arbor forms a radial collar for the hob, in order to thereby introduce the tension or pressure stress of the clamping element directly into the hob and to mount it axially in this way. This mounting, according to the invention, can thereby meet requirements even of comparatively low concentricity tolerances.

In particular, the invention can excel if the tool holder according to the invention is used in an attachment head. For this purpose, the attachment head can additionally have a spindle, a counter-holder, and radial bearings that are provided between support and spindle and between support and counter-holder.

BRIEF DESCRIPTION OF THE DRAWING

In the figures, the object of the invention is shown in greater detail as an example, using multiple exemplary embodiments. The figures show FIG. 1 a sectional view in the transverse direction of a tool holder according to a first exemplary embodiment, FIG. 2 a magnified partial view of FIG. 1, and FIG. 3 a partially represented sectional view in the transverse direction of a tool holder according to a second exemplary embodiment.

WAY TO IMPLEMENT THE INVENTION

Figure 1:
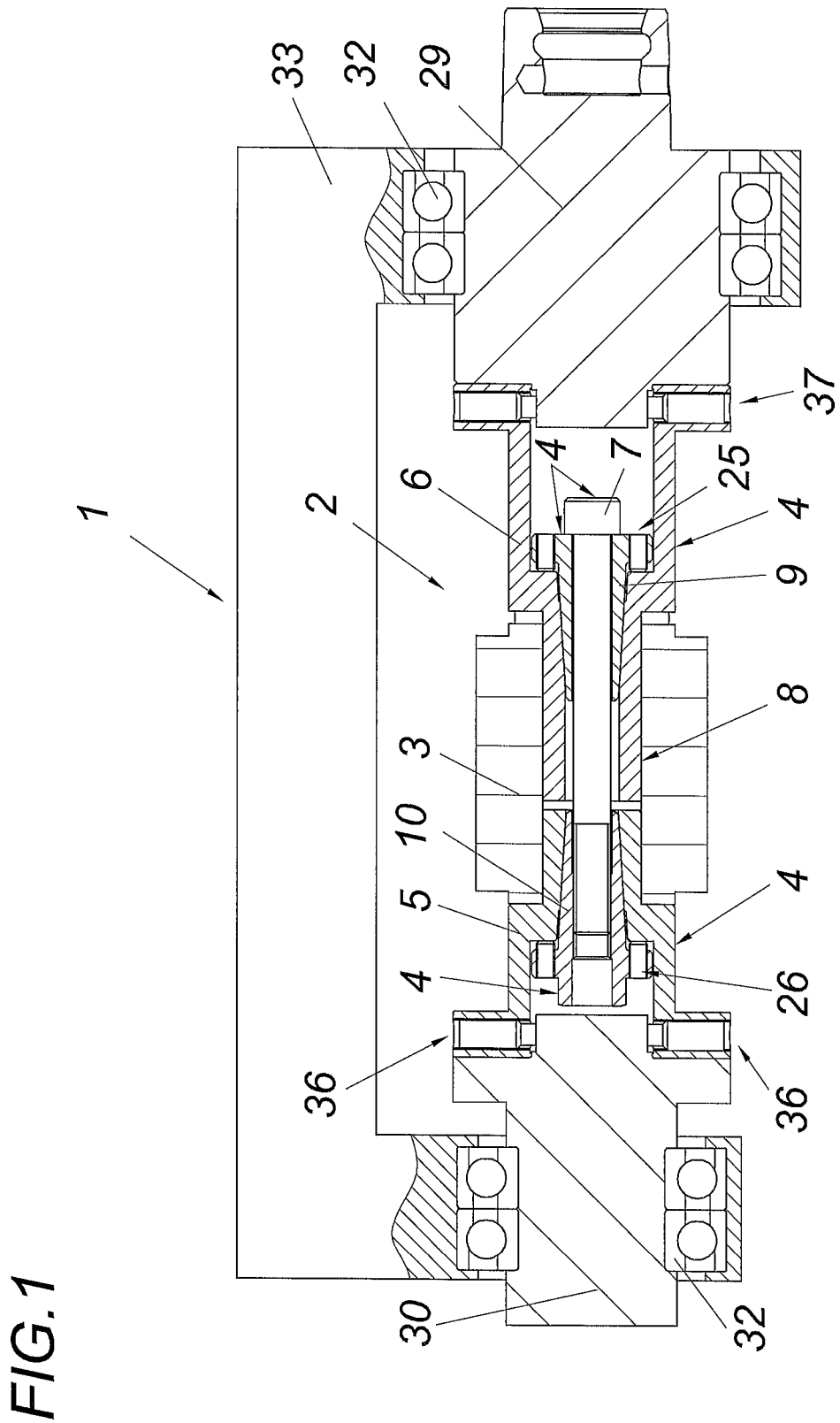

The first exemplary embodiment shown in FIG. 1 shows a tool holder 2 structured as an attachment head 1. The tool holder 2 is configured in such a manner that a hob 3 in a bore design can be mounted radially and axially. For this purpose, a clamping device 4 is provided, which has a one-piece centering clamping piece 5, a one-piece arbor 6, and a clamping anchor 7, which parts can be better seen in FIG. 2. Centering clamping piece 5 and arbor 6 engage into the axial bore 8 of the hob 3, and are braced relative to one another by means of the clamping anchor 7, thereby causing the hob 3 to be axially mounted on the clamping device 4. This is because the clamping anchor 7 presses centering clamping piece 5 and arbor 6 axially against the hob 3.

The hob 3, which is mounted on the clamping device 4, can be set up or centered relative to the other parts of the tool holder 2 in simple manner, according to the invention. This is because centering clamping piece 5 and arbor 6 each form a flange 34 or 35, in order to be able to connect with the spindle 29 and the counter-holder 30. Spindle 29 and counter-holder 30 are fitted into the respective flange 34, 35 of centering clamping piece 5 and arbor 6. These flanges 34 and 35 are provided with a radial setting drive 36, 37, which drives have diametrically opposite setting elements 38 and 39, and can be adjusted radially against the spindle 29 and the counter-holder 30. These setting elements 38 and 39 are structured as stud screws. In this way, comparatively high concentricity of the hob 3 is ensured in stable manner.

In general, it should be mentioned that the spindle 29 itself can represent a tool spindle or can also be connected with the tool spindle in torque-proof manner, in order to thereby drive the tool or the hob 3.

The radial mounting of the hob 3 is produced, according to the invention, in that the clamping device 4 has two clamping elements 9, 10 that are operatively connected with the clamping anchor 7 assigned to it, which elements are provided between clamping anchor 7 and centering clamping piece 5 or arbor 6. By means of the tensile stress or pressure stress of the clamping anchor 7 on the two clamping elements 9, 10, these elements produce a pressing force between the centering clamping piece 5 or the arbor 6 and the hob 3, because this clamping elements 9, 10 each have an outer cone 11 and 12, respectively, which cones exert a wedge effect on centering clamping piece 5 and arbor 6. The outer cone 11, 12 therefore interacts with the centering clamping piece 5 or the arbor 6 to produce the radial mounting of the hob 3. Therefore the gudgeons 13, 14 of the centering clamping piece 5 and arbor 6 do not necessarily have to be provided with an extremely precise fit, when they engage into the axial bore of the hob 3, in order to allow comparatively high concentricity at the hob 3. The clamping device 4 according to the invention can therefore be kept simple, in terms of design, and nevertheless guarantees high concentricity precision.

The hollow centering clamping piece 5 and the hollow arbor 6 each form an inner cone 15, 16, against which the outer cone 11, 12 of the respecting clamping element 9, 10 lies. In this way, a low number of joins between clamping anchor 7 and hob 3 can be achieved. Furthermore, sensitive centering of the hob 3 relative to the clamping device 4 can be undertaken by means of these two interacting clamping surfaces. High concentricity is thereby ensured.

Mechanically, the clamping elements 9, 10 are coupled with the clamping anchor 7 or operatively connected by way of a thread. An outside thread 17 is provided on the clamping anchor 7, inside threads 18 are provided on the clamping elements 9, 10, which threads engage into one another.

The clamping elements 9, 10 each form a radial clamping collar 19, 20. These clamping collars 19, 20 lie against the respective crosspiece 21, 22 of the centering clamping piece 5 or arbor 6, and thereby brace them axially. Because these crosspieces 21, 22 also form a radial collar 23, 24 for the hob 3, a direct operative connection between clamping collar 19, 20 and hob 3 can allow sensitive axial mounting.

These radial clamping collars 19, 20 also each support an axial setting drive 25, 26, which has multiple diametrically opposite setting elements 27, 28. These setting elements 27, 28, which are structured as in screws, can be axially adjusted against the crosspiece 21, 22. The axial setting drives 25, 26 facilitate axial and radial mounting of the hob 3.

This radial mounting can be reinforced by means of a fitting spring between hob 3 and clamping device 4, which spring is not shown in any detail.

To form an attachment head 1, a spindle 29 and a counter-holder 30 are assigned to the tool holder 2; these two are connected with a support 33, by way of radial bearings 32, as can be seen in FIG. 1.

Figure 2:
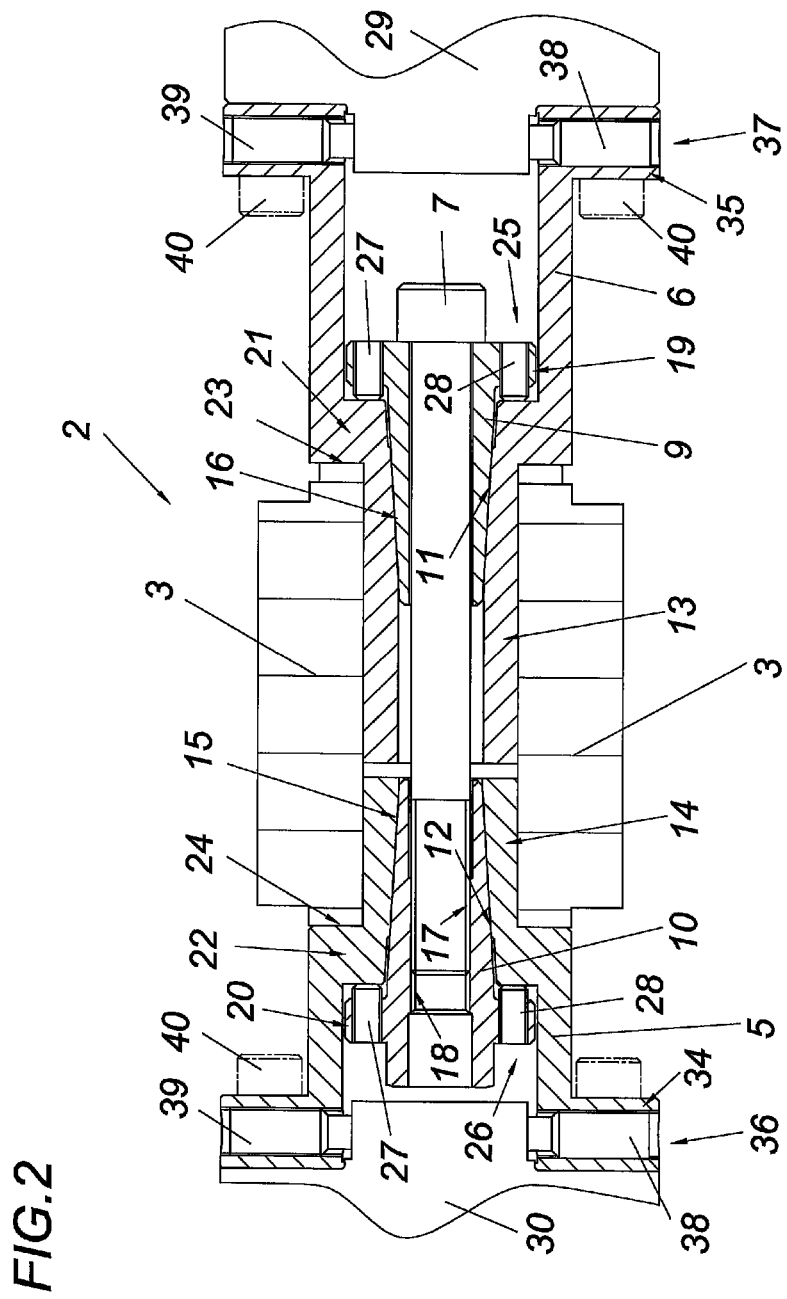

Furthermore, it can be seen in FIG. 2 that the flanges 34 and 45 are connected with the counter-holder 30 and the spindle 29 by way of screw connections 40, in order to create a connection that can withstand stress.

Figure 3:
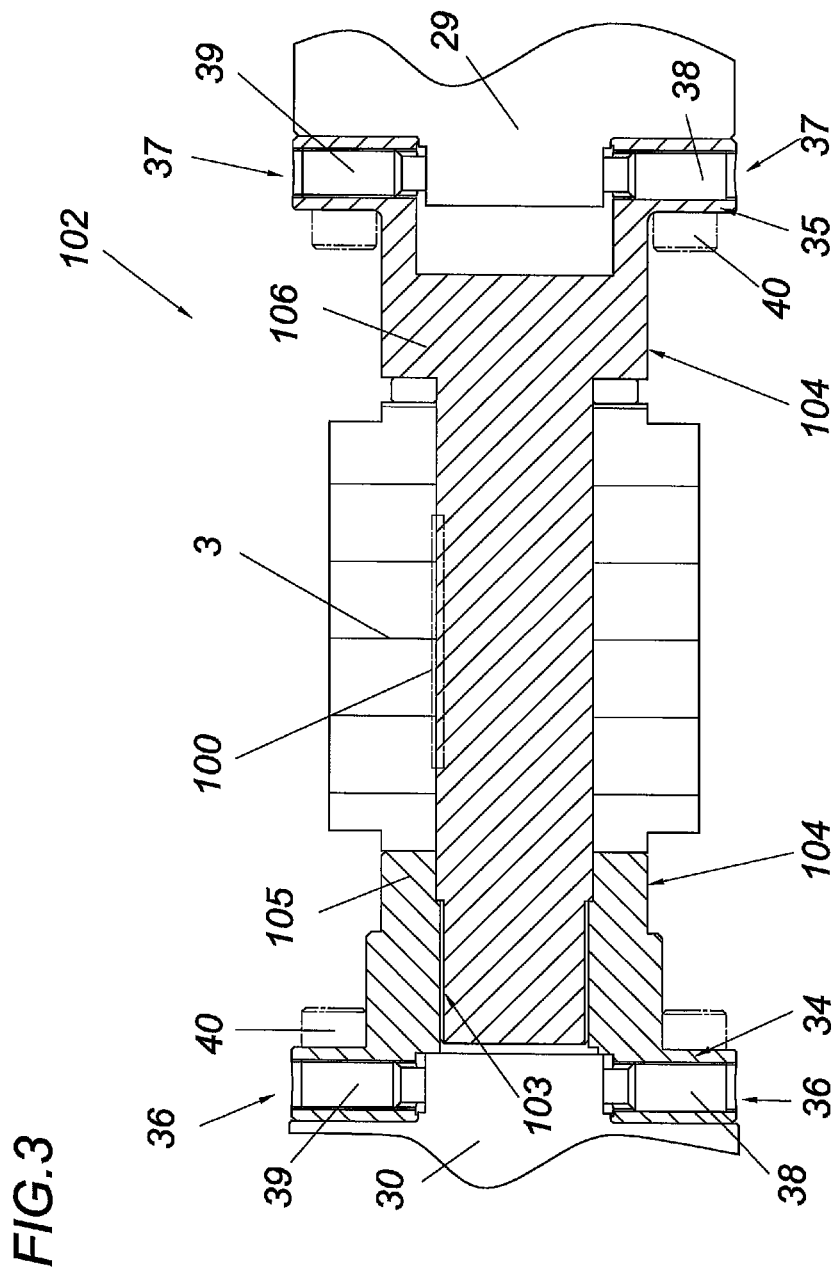

According to FIG. 3, an alternative tool holder 102 according to a second exemplary embodiment is shown in greater detail. This tool holder 102 differs from the tool holder 2 according to FIG. 2 essentially by a different design version of its clamping device 104. This is because this device makes do without a clamping anchor 7. In order to nevertheless be able to brace centering clamping piece 105 and arbor 106 relative to one another, the one-piece arbor 106 has an outside thread 103, onto which the one-piece centering clamping piece 105 is screwed in the manner of a nut. In this way, the hob 3 can be axially mounted.

Transfer of the torque is ensured by a clamping spring 100, shown with a dot-dash line and provided between arbor 106 and hob 3. Furthermore, sufficiently high stability of the centering precision is ensured by means of a narrow fit play between clamping spring 100 and arbor 106 or clamping spring 100 and hob 3.

Centering clamping piece 105 and arbor 106 are equipped (just like in the exemplary embodiment according to FIG. 2) with a flange 34, 35. The flanges 34 and 35 support radial setting drives 36, 37 having setting elements 38, 39 that can be adjusted against the spindle 29 or the counter-holder 30, in order to thereby be able to center the clamping device 104 in easy to handle manner.

The invention claimed is:

1. Tool holder for a hob (3) in a bore design, having a clamping device (4, 104) provided between a spindle (29) and a counter-holder (30), which device has a centering clamping piece (5, 105) that can engage with the hob (3) and an arbor (6, 106) that can engage into the hob (3), which arbor is braced together with the centering clamping piece (5, 105) in order to mount the hob (3), wherein the centering clamping piece (5, 105) has a flange (34, 35), wherein centering clamping piece (5, 105) and arbor (6, 106) each have a flange (34, 35) that each support a radial setting drive (36, 37) having at least one setting element (38, 39) that can be adjusted against the spindle (29) or the counter-holder (30), for centering the clamping device (4, 104).

2. Tool holder according to claim 1, wherein the spindle (29) and/or the counter-holder (30) is/are fitted into the respective flange (34, 35) of centering clamping piece (5, 105) or arbor (6, 106), and the setting element (38, 39) can be radially adjusted against the spindle (29) or the counter-holder (30).

3. Tool holder according to claim 2, wherein the radial setting drive (36, 37) has multiple setting elements (38, 39) that lie diametrically opposite one another, particularly stud screws.

4. Tool holder according to claim 1, wherein centering clamping piece (5, 105) and arbor (6, 106) are each configured in one piece.

5. Tool holder according to claim 1, wherein the clamping device (4) has a clamping anchor (7) that axially connects centering clamping piece (5) and arbor (6) and braces them relative to one another.

6. Tool holder according to claim 5, wherein the clamping device (4) has at least one clamping element (9, 10) operatively connected with the clamping anchor (7), which element is provided between clamping anchor (7) and centering clamping piece (5) or arbor (6), and interacts with these to produce radial mounting of the hob (3).

7. Tool holder according to claim 6, wherein centering clamping piece (5) and/or arbor (6) has/have an inner cone (15, 16) against which an outer cone (11, 12) of the respective clamping element (9, 10) rests.

8. Tool holder according to claim 6, wherein a clamping element (9, 10) is provided, in each instance, for centering clamping piece (5) and arbor (6).

9. Tool holder according to claim 6, wherein the clamping anchor (7) passes through the hollow centering clamping piece (5) and the hollow arbor (6).

10. Tool holder according to claim 6, wherein the clamping anchor (7) engages into an inside thread (18) of the respective clamping element (10) with its outside thread (17).

11. Tool holder according to claim 6, wherein at least one clamping element (9, 10) has a radial clamping collar (19, 20), which lies against a crosspiece (21, 22) of the centering clamping piece (5) or of the arbor (6).

12. Tool holder according to claim 11, wherein the radial clamping collar (19, 20) supports an axial setting drive (25, 26) having at least one setting element (27, 28) that is axially adjustable against the crosspiece (21, 22).

13. Tool holder according to claim 12, wherein the axial setting drive (25, 26) has multiple diametrically opposite setting elements (27, 28), particularly stud screws.

14. Tool holder according to claim 11, wherein the crosspiece (21, 22) of the centering clamping piece (5) or of the arbor (6) forms a radial collar (23, 24) for the hob (3).

15. Attachment head having a spindle (39), having a counter-holder (30), and having a tool holder (2, 102) according to claim 1, and having radial bearings (32) that are provided between support (33) and spindle (29) and between support (33) and counter-holder (30).

* * * * *